(12) United States Patent
Lauermann

(10) Patent No.: US 6,439,828 B1
(45) Date of Patent: Aug. 27, 2002

(54) METHOD AND DEVICE FOR RECEIVING MASS-PRODUCED ARTICLES, ESPECIALLY PLASTIC CUPS

(76) Inventor: Walter Lauermann, St.-Mauritius-Strasse 19, D-97320 Estenfeld (DE)

( * ) Notice: Subject to any disclaimer, the term of this patent is extended or adjusted under 35 U.S.C. 154(b) by 0 days.

(21) Appl. No.: 09/646,591

(22) PCT Filed: Mar. 19, 1999

(86) PCT No.: PCT/EP99/01862

§ 371 (c)(1), (2), (4) Date: Nov. 1, 2000

(87) PCT Pub. No.: WO99/48781

PCT Pub. Date: Sep. 30, 1999

(30) Foreign Application Priority Data

Mar. 20, 1998 (DE) .......................... 198 12 414

(51) Int. Cl.⁷ ............................... B65G 57/16
(52) U.S. Cl. ................ 414/788.2; 414/798.4; 414/798.9
(58) Field of Search ............... 414/788.2, 788, 414/788.1, 798.2, 798.4, 798.9, 225.01, 222.01

(56) References Cited

U.S. PATENT DOCUMENTS

| | | | | |
|---|---|---|---|---|
| 1,940,067 A | * | 12/1933 | Wessman | 312/43 |
| 3,957,415 A | * | 5/1976 | Edwards | 425/387 B |
| 4,787,798 A | | 11/1988 | Padovani | 414/30 |
| 6,022,208 A | * | 2/2000 | Padovani | 425/403.1 |
| 6,042,360 A | * | 3/2000 | Padovani | 425/403.1 |

FOREIGN PATENT DOCUMENTS

| | | | | |
|---|---|---|---|---|
| DE | 73302144 | | 8/1973 | |
| DE | 3237943 | A1 | 4/1984 | |
| DE | 3541900 | A1 * | 11/1985 | ........... B65G/47/90 |
| DE | 3624683 | C2 | 12/1987 | |
| DE | 91083443 | | 10/1991 | |
| DE | 4436531 | C1 | 4/1996 | |
| DE | 19509057 | C2 | 9/1996 | |
| GB | 2191459 | A | 12/1987 | |

* cited by examiner

Primary Examiner—Eileen D. Lillis
Assistant Examiner—Michael Lowe
(74) Attorney, Agent, or Firm—Pandiscio & Pandiscio

(57) ABSTRACT

The invention relates to a method for receiving mass-produced individual or stacked articles or products, especially plastic cups, which after having been produced in a moulding and/or punching machine are ejected from same. The device comprises a catching device for catching the ejected products and a stacking device which receives the products from the catching device and after stacking holds them ready for further transport. The catching and stacking devices can be moved away from and towards each other. The stacking device is used during the movement towards the catching device for seizing the product(s) held in the catching device and during the movement away from the catching device for withdrawing the product(s) from the catching device.

39 Claims, 10 Drawing Sheets

Figure 1:
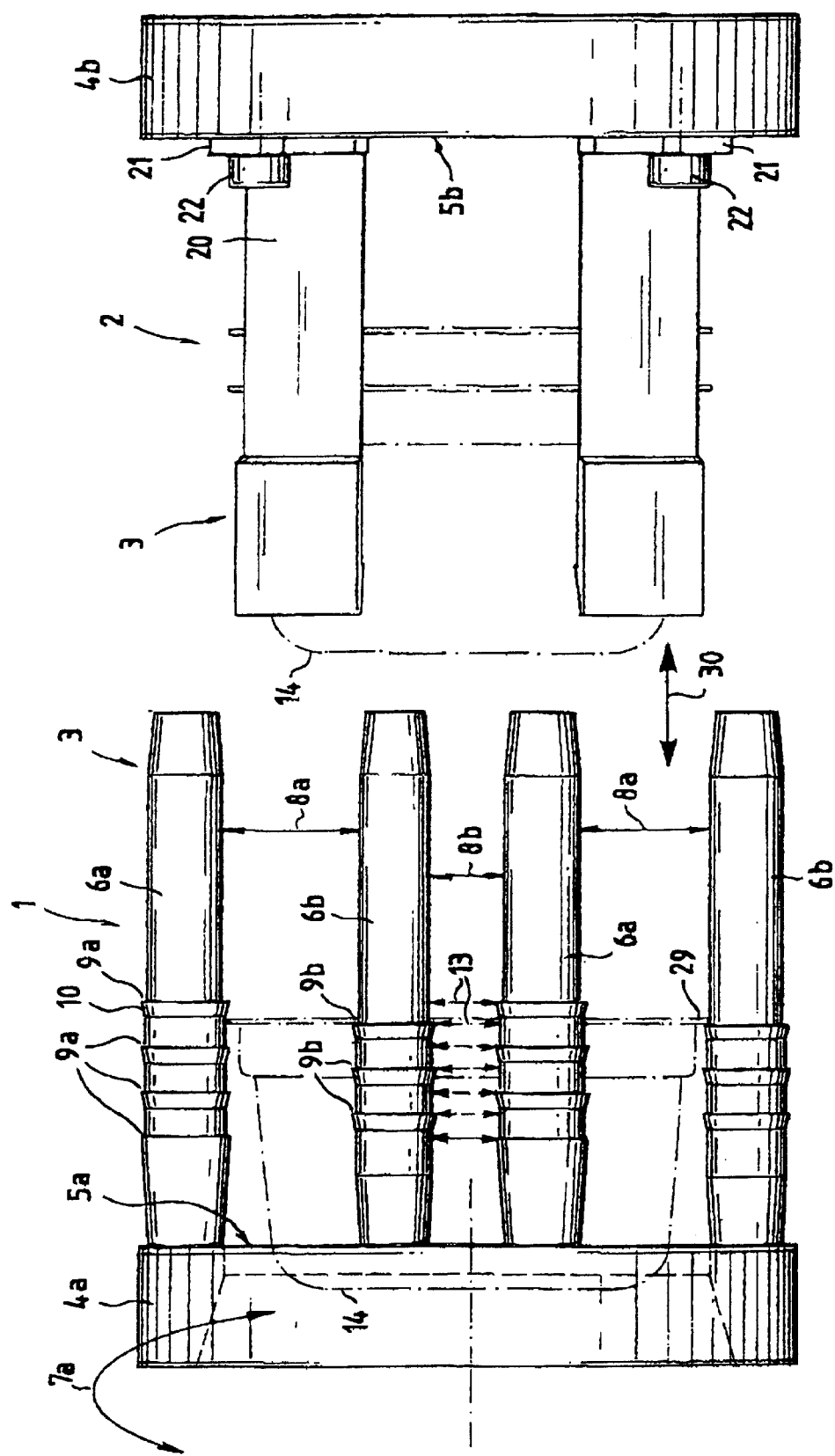

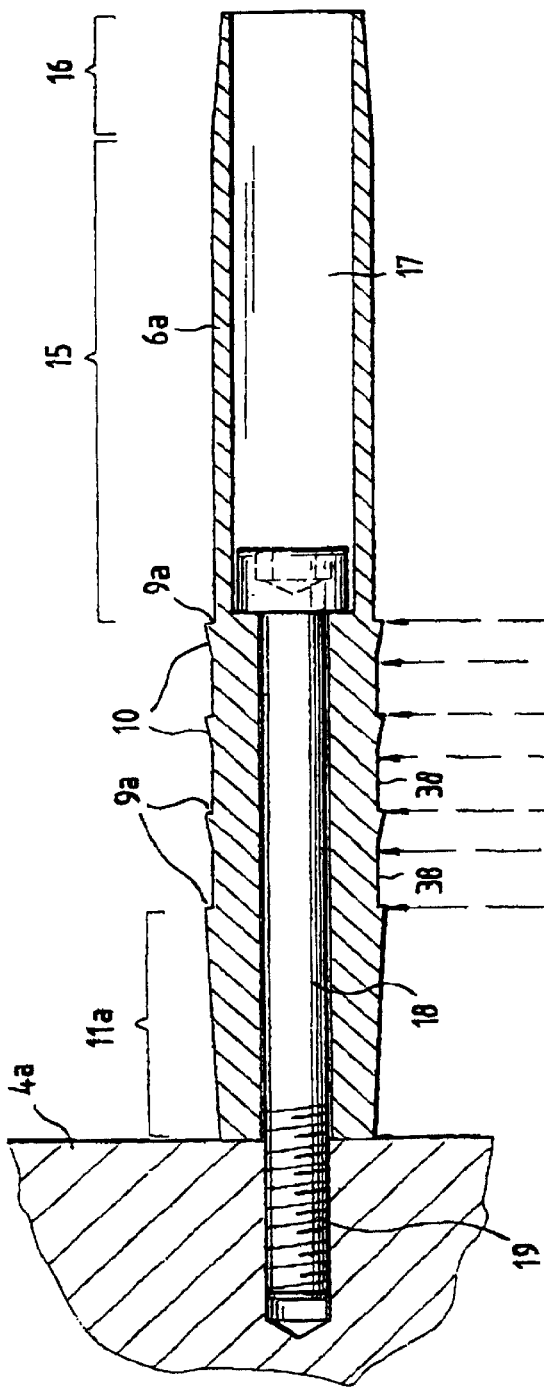
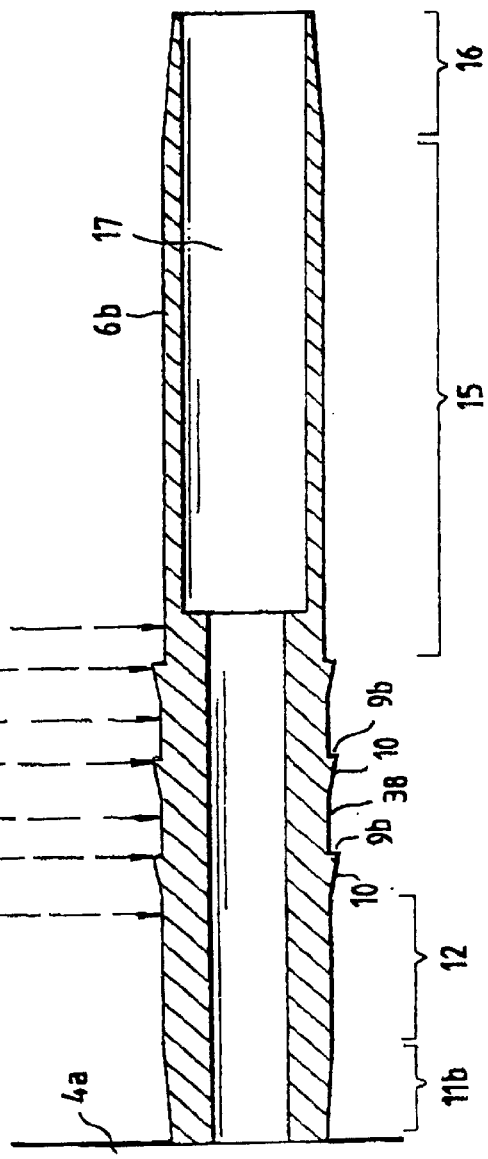
FIG. 2a
FIG. 2b

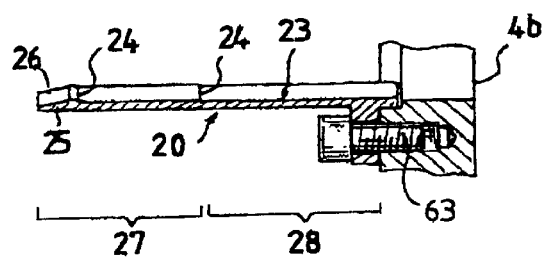
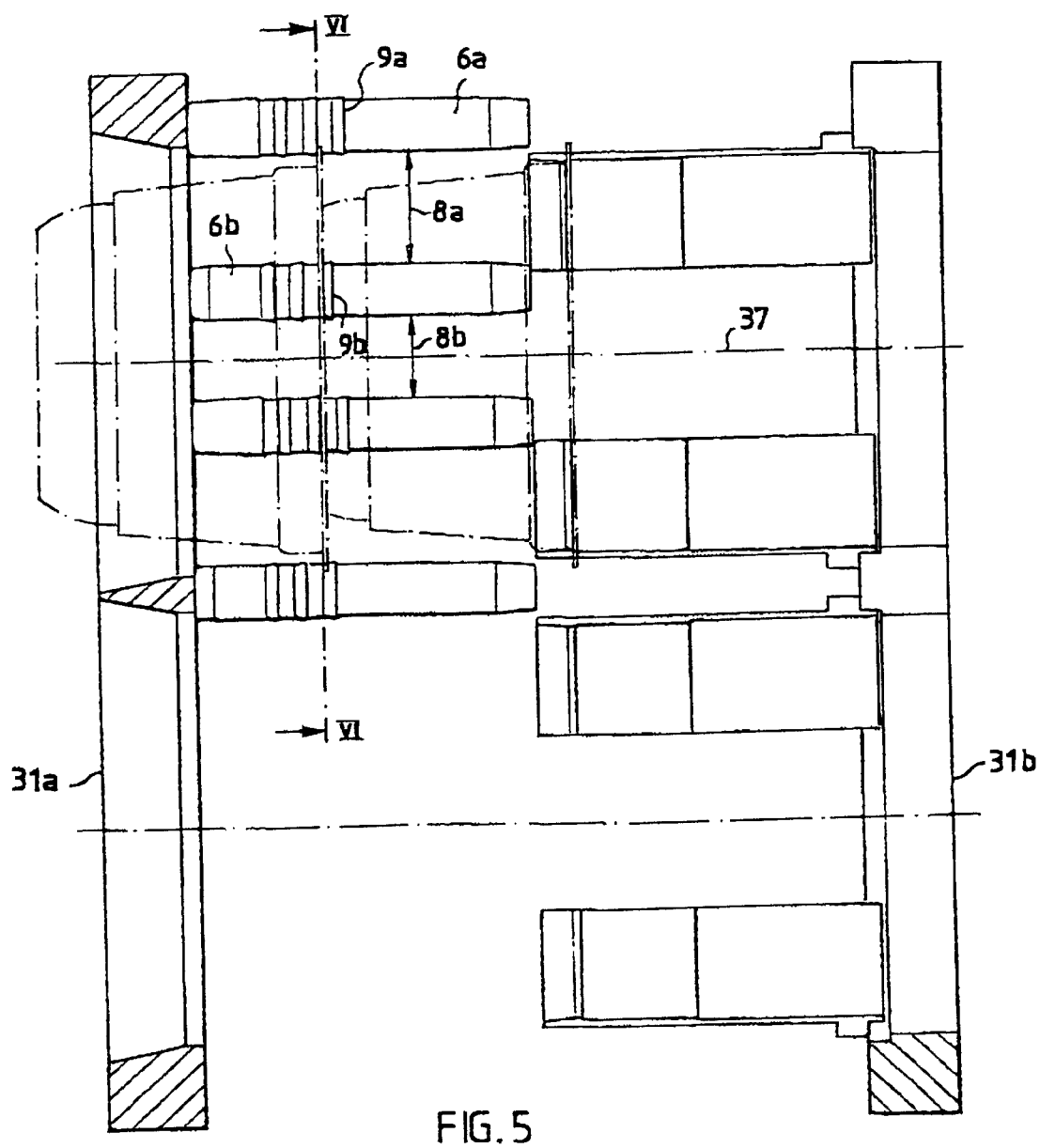

METHOD AND DEVICE FOR RECEIVING MASS-PRODUCED ARTICLES, ESPECIALLY PLASTIC CUPS

The invention relates to a method and an apparatus for receiving mass-produced articles or products for stacking, especially plastic cups, which after having been formed in a moulding and/or punching machine are ejected from same. The apparatus comprises a catching device assigned to the machine for receiving the products after they leave the machine and a stacking and holding device located downstream of the catching direction, in which the products are received and after stacking held ready for further transport. The catching and the stacking and holding devices are capable of being moved towards one another and away from one another. The invention relates further to a stacking and holding device suitable for use in the receiving apparatus, which comprises at least one stacking channel and one or more claw elements which run parallel with the stacking channel, surround the latter and are provided on their inner side facing the stacking channel with one or more gripping pawls adjustable rotationally and/or translationally for the grasping of mass-produced articles, especially plastic cups. The invention relates further to a gripping pawl suitable for use in the stacking device, which possesses an inner side assigned to a product or item for stacking and a rearward outer side, wherein there are formed on the inner side one or more undercuts, steps or depressions as claw elements or shear means for the product or item for stacking.

In the manufacture of plastic cups by the deep-drawing process, the use of polystyrene as a material is known. The latter is increasingly being replaced by polypropylene, which is available as a low-price material, but is more difficult to process. An article made from the latter does not acquire its final strength until hours after its manufacture. It is therefore particularly important that the "soft" articles ejected from the machine are as far as possible protected against mechanical forces in the axial and radial direction during the subsequent stacking operation.

For the producing of deep-drawn parts of such thermoplastic material, in particular cups or other receptacles, an apparatus for the moulding, punching and stacking of said parts is known (German utility model 91 08 344.3). After the moulding of the plastic part the mould is opened and the plastic part is pushed into a stacking apparatus. In order to ensure a reliable transfer of the articles into the stacking apparatus, the mould is swivelled and opened, and the stacking apparatus is moved towards the Mould. It is disadvantageous here that the last plastic part ejected, which is still hot and therefore easily deformable, has to displace axially the plastic parts already stacked within the stacking apparatus. Hence a deformation of the last part ejected and received in the stacking apparatus is easily possible. For example, deformed plastic parts of an oval shape can be printed on later only with difficulty, since they can cause friction in the printing machine, something which causes fault messages.

DE 36 24 638 C2 discloses a retaining apparatus for a stacking channel, in which lids for plastic receptacles are held by means of guide rods bounding the stacking channel. The retaining apparatus is distinguished by pawls which are integral with the guide rods and are spring-mounted radially by means of compression springs. The front side of the spring-mounted pawls faces the inside of the stacking channel and consists of flat flanks which are arranged in saw-tooth-like sequence, such that there form in the area of the deeper parts of said flanks projections running in transverse direction for the edges of the lids to be held. However, the projections lie diametrically opposite one another so that bottlenecks are formed which lead to a distortion of the lids. Moreover, nothing is disclosed as to how the lids are transferred out of a mould and introduced into the stacking channel. A further disadvantage consists in the fact that the last lid to arrive in the stacking channel has to give a push to the preceding lid, which reduces the dimensional stability considerably, since a strong mechanical pressure is thereby exerted on the last lid introduced, which is still hot and hence deformable.

DE 32 37 943 A1 discloses a magazine for the stacking of paper articles, in which there are arranged on at least one guide side of the magazine, as guide surfaces, oblique surfaces succeeding one another after the manner of scales. The oblique surfaces constrict the guide shaft in the guide direction and are intended to prevent the thin sides of the paper articles, for which a wedge shape is assumed, preceding the thick sides in the guide direction. Here again nothing is inferable about the take-over of the paper articles out of a mould or similar.

DE 44 36 531 C1 discloses a method for converting particles formed and punched out of a thermo-plastic film in several rows into single-row stacks. Cups formed out of thermo-plastic film are placed in receiving spectacles by means of a vacuum transfer device. The receiving spectacle is displaced in flow direction by one row interval and then moved back again. Apparently, however, the stacks can reach only a height of three cup units.

A receiving apparatus roughly of the kind mentioned in the preamble is known from the German patent DE 195 09 057 C2. In the latter a sub-division into two steps of the transfer movement from the mould to a stacking conveyor belt is proposed, by means of which the movement time per step is,to be reduced In the first step the plastic parts, for example cups, are pushed and sucked out of the opened mould onto a first receiving plate. By swivelling of the first catching or suction plate the cups arrive with the bottom foremost at a second suction plate, where they are sucked once again. They are further blown away from the first catching or suction plate by a short blast of compressed air. While the first catching or suction plate is being swivelled back again, the second suction plate is displaced linearly together with the cup sucked on the bottom side and is lowered to an extent such that the cup may be deposited on an already assembled stack of cups. This poses an additional requirement in control terms, however, namely that the vertical movement of the second suction plate has to be reduced from one cycle to the next, because the stack grows in its height. The swivelling of the first catching and suction plate also poses an additional requirement in construction terms. It is a further complication that the movements of the first catching and suction plate and of the second suction plate have to be coordinated or synchronised with one another, which leads to further control requirements.

The invention is based on the object of further developing a receiving method and a receiving apparatus of the kind mentioned in the preamble, while at the same time avoiding the above-mentioned disadvantages, in such a way that through careful handling of the plastic products ejected from the mould a simplification in the sequence of movements and in the equipment design is achieved. In particular the number of the transfer stations between plastic mould and stacking site and of the drive components required is to be reduced. In addition, a considerable simplification of the sequence control of the transfer components which grasp the plastic products is to be aimed for. Finally, the reliability of the taking over of the plastic products out of the mould and their stacking in the operating sequence is to be increased, in the course of which the plastic products are to be handled in a careful manner.

In order to solve this set of problems, it is proposed in the case of a receiving method for instance of the kind mentioned in the preamble that the stacking and holding device be used during the movement towards one another to grasp the product or products as they leave the catching device and during the movement away from one another to withdraw the product or products out of the catching device. The practice conventionally adopted in the prior art of operating the stacking and holding device, during the depositing of the products by the catching and transfer device, merely as a passive base or standing surface will therefore be abandoned. Instead, according to the invention, the stacking and holding device will be provided with an active role or function, namely of itself fetching the products from the catching device, after which the option of a careful stack formation then exists. The possibility is therefore further created of simplifying considerably the sequence of movements for the catching device and also the sequential control in time and synchronisation. A particular development of the invention thus consists in the fact that the moving towards and away from one another of the catching and stacking and holding devices takes place linearly and/or regularly alternately. With the linear sequence of movements a change in the alignment of the product grasped in the catching device is avoided or no longer necessary. Above all in the case of a cup shape the products may be grasped by the catching device out of the mould without a change in their movement alignment and transferred into the stacking and holding device, as well as—while maintaining the movement alignment out of the mould—being stacked on top of one another there. It also comes within the scope of the invention, however, to combine the sequence of movements above all outside the product transfer period with non-linear, circular and/or polygonal movement paths, including turning or swivelling movements. Thus there may be imparted to the catching device, after the setting of an adequate distance from the stacking and holding device relative to the mould, a bending and/or swivelling movement.

On the basis of the general inventive idea there arises the possibility, during the movement towards one another, of using the catching device for the sliding of the product or products into the stacking and holding device. In particular, a product already located in the stacking and holding device may during or after the movement towards one another be displaced further by the catching device, in order to operate further the stacking of the products there.

As regards the receiving of freshly moulded plastic products, their cooling with retention of the specified form is problematical. In this respect it is provided according to a particularly advantageous form of the invention that the last product which has been grasped in the stacking and holding device is for the period at least of a movement away from and subsequently towards one another be prevented from making contact with previously gripped, optionally stacked products pending the gripping of a next product.

In order to solve the above set of problems there is proposed according to the invention, for a receiving apparatus with the features according to the preamble, the arrangement of gripping members singly or as a plurality on or in both the catching device and the stacking and holding device. The gripping members are formed in such a way that with the movement of the catching and stacking and holding devices towards one another and away from one another a taking over of the products by the catching device into the stacking and holding device takes place. The possibility is therefore created of the particularly advantageous development according to which the stacking and holding device may be anchored or kept still in a fixed position, for example in a machine foundation plate, while the catching device may move to and fro between the plastic mould and the stacking and holding device in a simple, preferably linear movement. On the basis of the invention the taking over and stacking process for the plastic product may be divided into two phases: taking over of the plastic product out of the tool by means of the catching device; transfer of the plastic product out of the catching device to the stacking and holding device and stacking there, wherein a bringing of the two devices closer to one another takes place.

According to a particular development of the invention the gripping members for the catching and the stacking and holding devices are formed projecting in each case. A careful transfer of the fresh plastic product reaching the stacking and holding device from the mould may be more easily secured in this way. This is promoted, in a further expression of the invention in concrete terms, by the gripping members disposed on the catching device and the gripping members disposed on the stacking and holding device being offset relative to one another. The catching and the stacking and holding devices may thereby during their movement towards and/or away from one another be mutually crossed or penetrated and/or engaged by their respective (mutually offset) gripping members. A plastic product already grasped by the catching device may thus be taken over by the penetrating gripping members of the stacking and holding device and remain there in the course of the separation.

A careful transfer of fresh and still deformable plastic products may be facilitated by the gripping members being arranged symmetrically with respect to a plane, axis, centre or other symmetry element within the catching and/or stacking and holding device, and said symmetry element lying congruent with a symmetry element of the assigned or to be grasped product. As a particular development of said concept the gripping members are arranged along a profile or plan view which corresponds to the periphery, the outline or the miscellaneous shape of the product to be received.

According to a development of the invention the gripping members are provided with suspension, clamping, locking, snap and/or hook elements, which are constructed for detachable engagement with the product to be grasped. The gripping function in the catching or the stacking and holding device may be accomplished with said elements. The above-mentioned elements are with expediency arranged at points from which they may grasp the plastic product as carefully as possible and in particular in its most robust areas and sections, for example in the case of cups the opening edge.

According to a further development of the invention the gripping elements are provided with claw, stay or barb elements or other pulling and/or shear means, so that in the course of the movement towards and/or away from one another of catching or stacking and holding device there is imparted to the grasped products a pulling, sliding or shear force in the direction from the catching to the stacking and holding device. A careful sliding onto an already existing stack of previously accepted plastic products may thereby be achieved. In particular the prevention of the disadvantage resulting from the prior art, namely that a freshly formed and taken over product has to displace a stack already formed from products taken over earlier, is supported. For the shear means may in particular be arranged staggered in such a way that for the last plastic product taken over, which is still fresh or hot, initially a certain distance is observed with respect to the stack of products taken over earlier.

In order, during the grasping of a plastic product by the gripping members, to minimise the pressure on the product as far as possible, it is provided according to a development of the invention that the above-mentioned elements or shear means, in particular if they lie on different gripping members, are arranged mutually offset in the direction of the catching to the stacking and holding device. A so-called "high-deep effect" may be achieved in this way: if the above-mentioned elements or shear means project with respect to the product, but lie mutually offset in the take-over direction, the number of bottlenecks will be reduced considerably and hence the risk of deformation of the fresh and still sensitive plastic product be minimised. Said advantageous effect may be promoted still further if different gripping elements distanced from one another possess different quantities of the elements or pulling or shear means. The offset arrangement may be accomplished more easily in this way.

In order to achieve a compact and specific gripping and guiding effect above all in the catching direction, according to an advantageous development of the invention the gripping members, even if they are assigned to a product to be grasped jointly, are arranged or sub-divided into different groups. The gripping members of a group, for example of a pair or with two gripping members, possess a far smaller distance from one another than from the gripping members of another group. The gripping and guiding function may therefore be localised more intensely on particular areas or sections of the product to be grasped.

In order that a reliable stacking is achieved for the plastic products in continuous take-over mode, it is provided according to a development of the invention that the gripping members are formed in particular on the stacking and holding device as two-dimensional claw projections with an inner side assigned to the product and a rearward outer side, wherein in the inner side one or more undercuts, steps or depressions are formed as claw elements or shear means. If the two-dimensional extension in the direction of the periphery or outline of the product to be grasped is sufficiently wide or great, channels are then obtained for the products, on the basis of the above-mentioned development of the invention, which ensure a secure and reliable stacking, Stability against shaking and vibrations, as well as against collapse of the stack resulting therefrom, is also promoted.

Irregularities in the shape of the product or the item for stacking may arise during long-term practical operation, in particular in the case of a cup ejected from a mould. This may lead to impairment of the transfer between catching and stacking and holding device, wherein even mutually colliding gripping members of the catching and stacking and holding devices may lead to mechanical damage or deformation, in some cases in operative connection with remaining products or items.

To solve this set of problems, it is proposed according to the invention in the context of the general inventive idea, for a stacking and holding device possessing the features mentioned in the preamble, that the gripping pawl be freely pivotable about an axis which runs parallel with the stacking channel. Due to the free pivotability the gripping pawl may, in order to grasp the item of material, nestle up against its production contour largely snugly or positively. It is no longer necessary during the prior assembly of the stacking and holding device to align the gripping pawl in its exact rotary position, instead this takes place afresh and automatically for each item of material to be stacked. Due to the rotatory degree of freedom about an in particular axis parallel axis of rotation, a stacking channel may be formed which may as it were adapt dynamically to a certain extent to differences in shape of the product for stacking. The stacking channel as it were "breathes" with the shape tolerances arising from mould and catching device and impressed on the item of material to be stacked. The further advantage is obtained that in the event of a collision of a gripping member of the catching device with the claw member or its gripping pawl on the stacking and holding device the gripping pawl may deviate to a certain extent due to corresponding rotation. Thus a collision between gripping members on catching and stacking and holding devices is offset and mechanical deformation of the gripping members is avoided.

For the further dimensional stabilization of the gripping members on catching and stacking and holding device (clamping arbors or claw elements) the gripping pawl is according to an advantageous development of the invention surrounded by a protective wall which is so constructed and arranged at a distance relative to the gripping pawl that the gripping pawl-facing inner side of the protective wall forms a rotation limiting stop with rotation play for the gripping pawl. The gripping pawl is thereby prevented from being able to rotate too far compared with the optimal gripping position and in so doing forming an obliquely positioned obstacle to the incoming product for stacking and deforming the latter mechanically.

According to a further, suitable development the axis of rotation of the gripping pawl is embedded in the protective wall or kept non-rotatable therein and bears on its free end projecting out of the protective wall and parallel with the stacking channel the freely pivoting gripping pawl.

To enable the gripping pawl to have a rotation play relative to the basic body of the stacking and holding device, in particular relative to the protective wall, it is suitable to provide the gripping pawl axis of rotation with stopping means which are capable of being coupled or brought into engagement with the basic body or the protective wall of the stacking or holding device. In order that the stopping means against the gripping pawl axis of rotation may be actuated, it is provided according to an advantageous development of the invention that the protective wall is provided on its inner side (facing the gripping pawl) with an opening or recess leading to the axis of rotation and preferably positioned radially with respect to the stacking channel. In addition, the above-mentioned stopping means for the axis of rotation may be actuated in order to fix them relative to the miscellaneous stacking and holding device equipment.

Within the scope of the general inventive idea for solving the complex set of problems according to the invention it is proposed according to the invention, for a gripping pawl with the features mentioned in the preamble, that the latter be provided with an axis of rotation integral with the body which takes the form of an elongated basic body comprising a top end and a bottom end. To the top end is attached, freely rotatable, a gripping head assigned to the respective product for stacking. At the bottom end and/or also in the central area of the basic body are formed means for stopping against or opposite the stacking and holding device. By means of the latter the gripping pawl axis of rotation may be fixed non-rotatably within the basic body of the stacking and holding device. The gripping head may then rotate to and fro on the axis of rotation or the elongated basic body opposite the other part of the stacking and holding device.

In order that further, flexible degrees of freedom are also provided for the gripping head for the nestling against multifarious shapes and contours of the item for stacking, a development of the invention consists in the elongated basic body being manufactured of elastically and/or springily pliable material. There is formed as it were an elastically pliable stock on which the gripping head may [be] deflected springly through being acted upon by items for stacking and return pendulum-like into its initial position again.

With the structure according to the invention for the gripping pawl, which may be broken down substantially into the gripping head and the elongated, stock-like basic body as axis of rotation, the possibility is created of a further advantageous development, according to which the gripping head may be mounted on the basic body so as to be capable of loosening or detaching and is simultaneously on its gripping inner side adapted in the shape or curvature there to the shape and/or contour of the item for stacking which is to be grasped. The advantage in production and storage terms consists in the fact that there may be retained for the elongated basic body as axis of rotation a standard form suitable for all applications. There may then be fitted to the basic body—depending on the form of the item for stacking—differently shaped or constructed gripping heads.

For the realisation of a simple pivoting for the gripping head, it is suitable to arrange the latter so that it is rotatable to and fro on its head end by means of a screw connection. In order that the rotation play is obtained, the gripping head must not be screwed home or tightened on the head end.

A suitable realisation of the stopping means consists in a manually screwable pin with external thread being disposed in an internally threaded bore which is constructed in the central area or at the bottom end of the basic body and passes through the latter at right angles to the longitudinal axis. In order to obtain the rotation play, there is expedient as a further development a screw limiting stop on the basic body for the gripping head. The latter is arranged at a distance measured relative to the screw-in thread at the top end of the basic body (for the gripping head), such that when the gripping head stops or comes to rest against the limiting stop the centre axis of the internally threaded bore runs parallel with a notional straight line which passes at an oblique angle through a lateral surface, assigned to the product or the item for stacking, of the gripping head. In conjunction with the just mentioned screw connection between gripping head and top end, the radial operational opening for the stopping means of the axis of rotation and the above-mentioned rotation-limiting stop, the possibility must be prevented, where rotation play for the gripping head is guaranteed, of the latter being screwed out from the basic body top end. In addition, in order that operation of the stopping means is possible, the centre axis of the internally threaded bore or of the externally threaded pin must lie flush or in a line or congruent with the longitudinal or access direction of the operational opening or recess. Thereby there is always guaranteed, in the case of the last-mentioned development of the invention, the rotation and screw play for the gripping head on the basic body top end.

Figure 3:
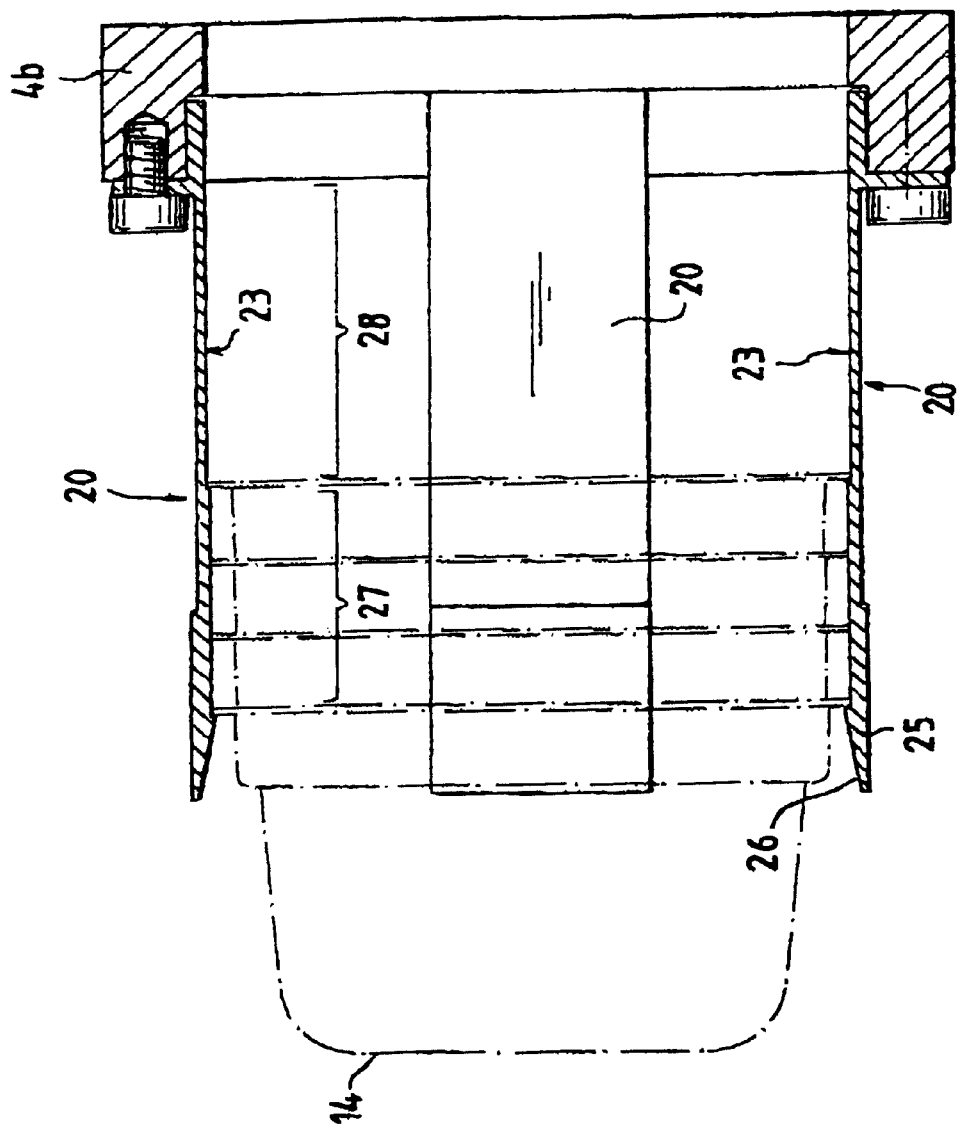
Figure 6:
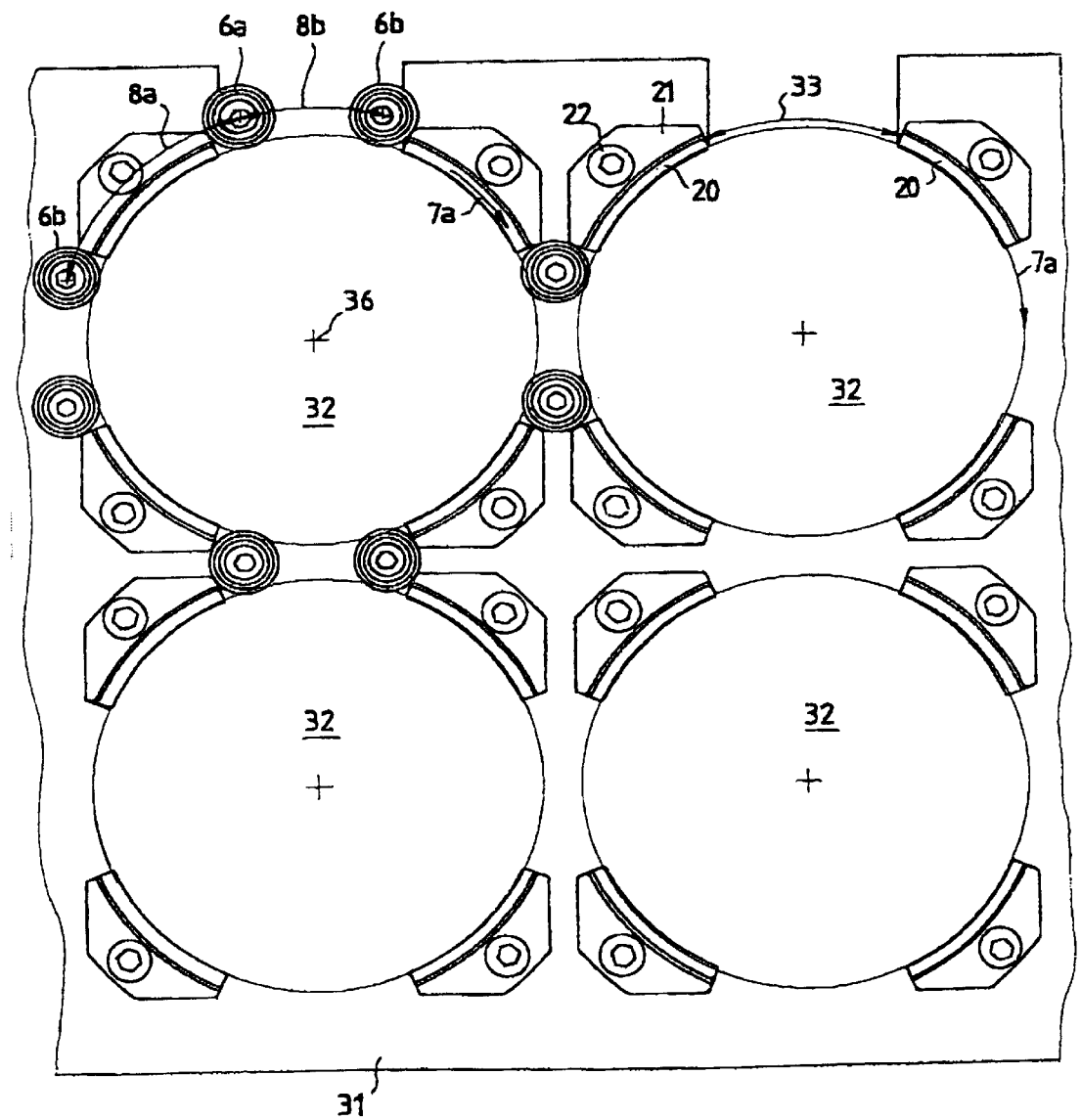
Figure 7:
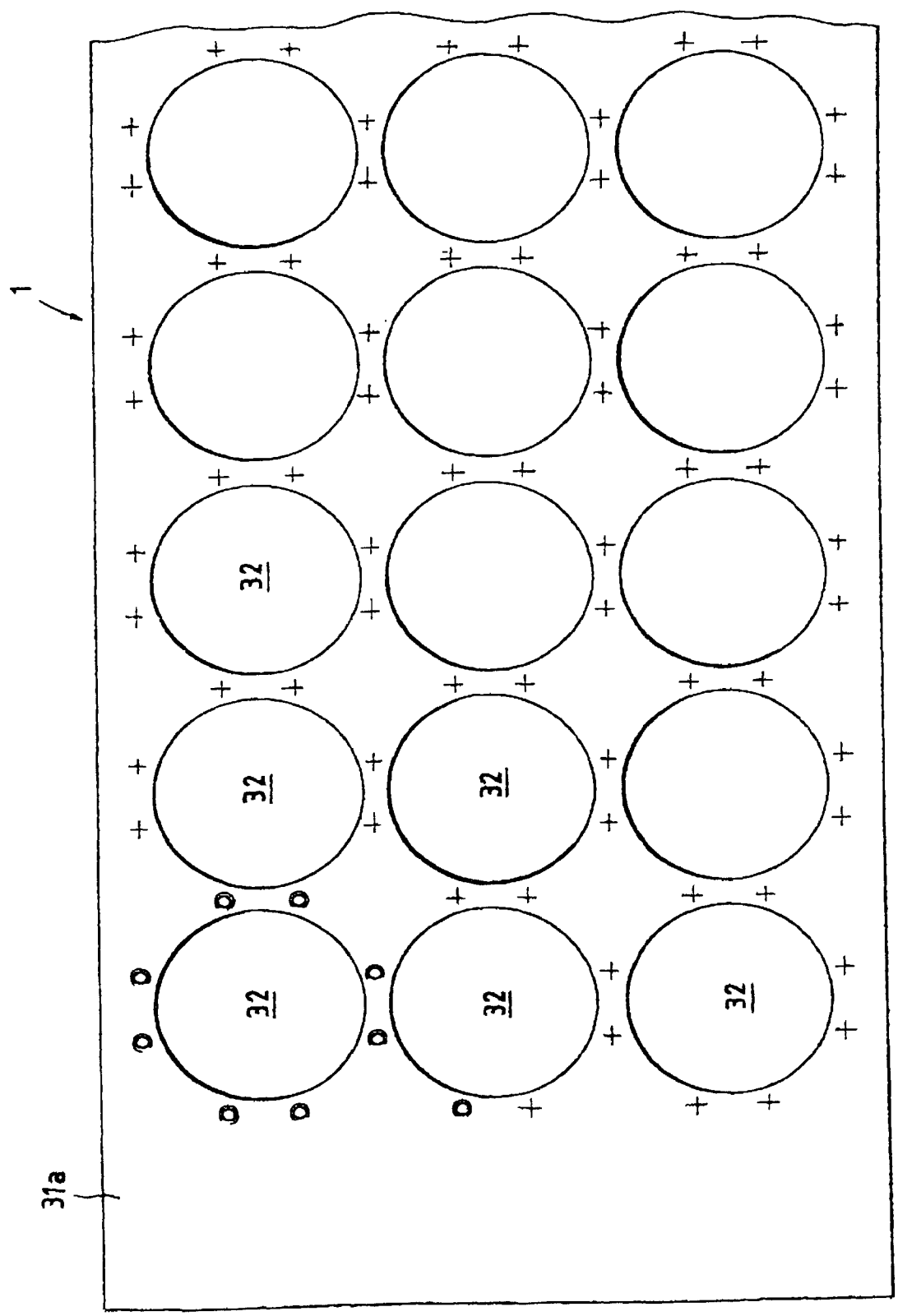
Figure 8:
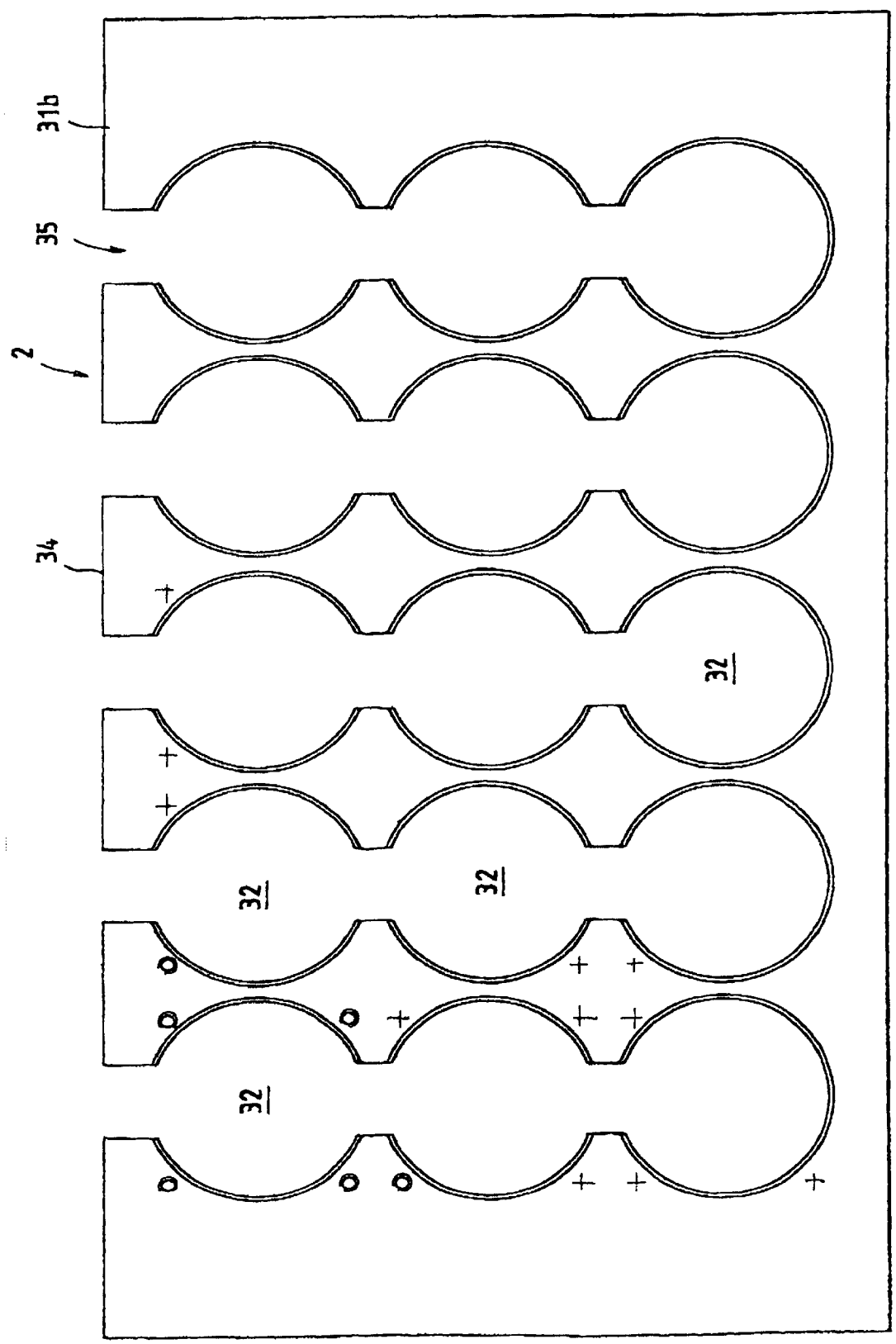
Figure 9:
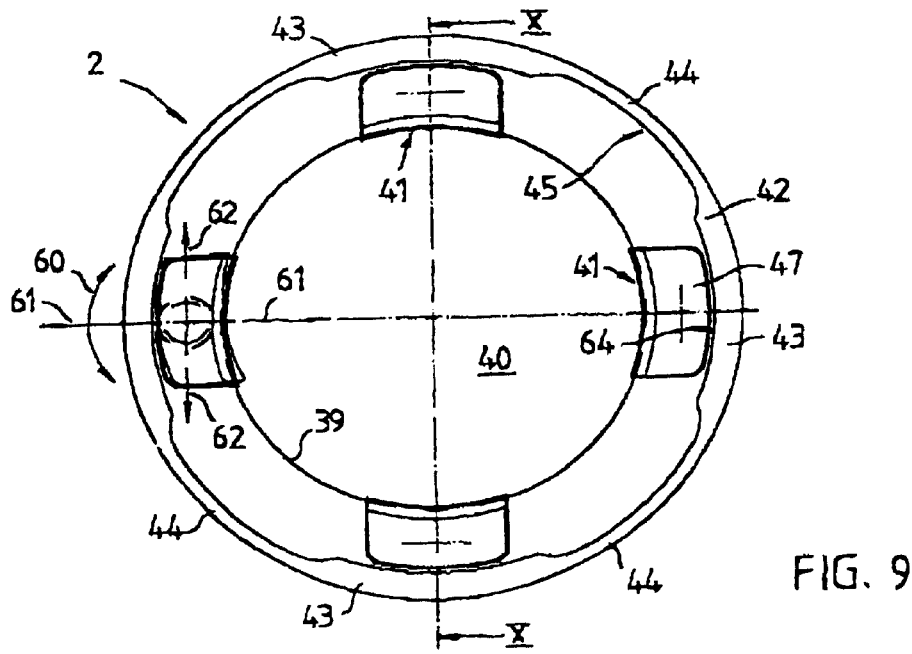
Figure 10:
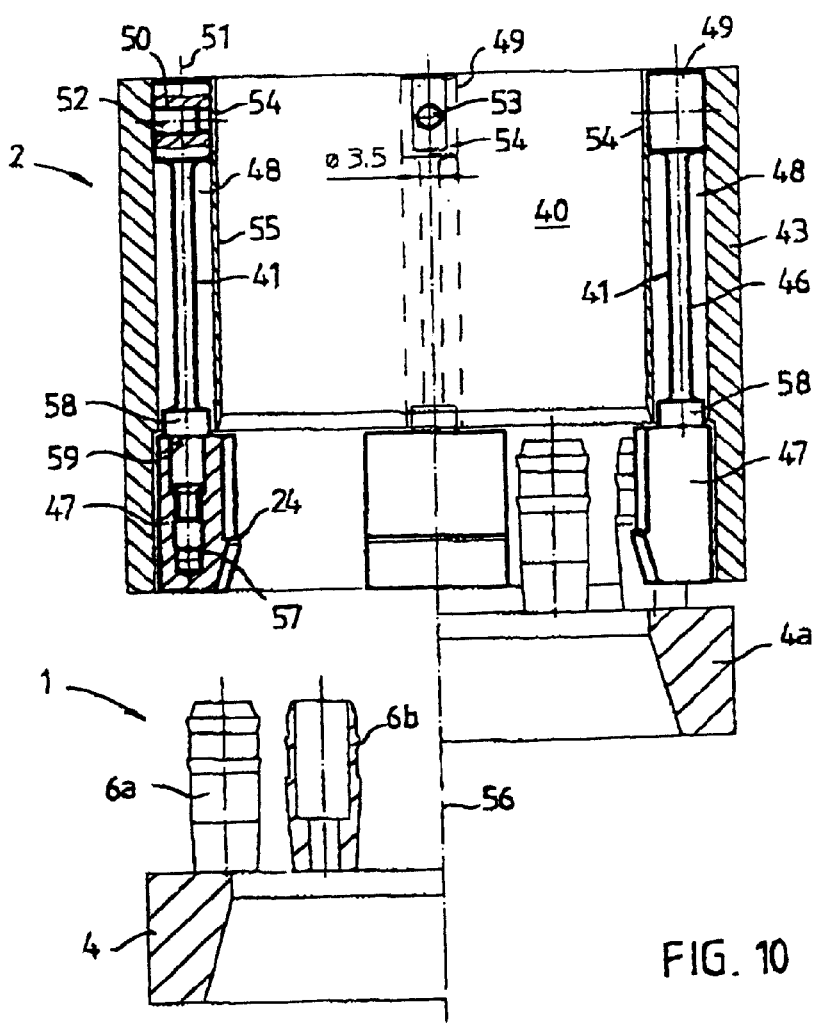
Figure 11:
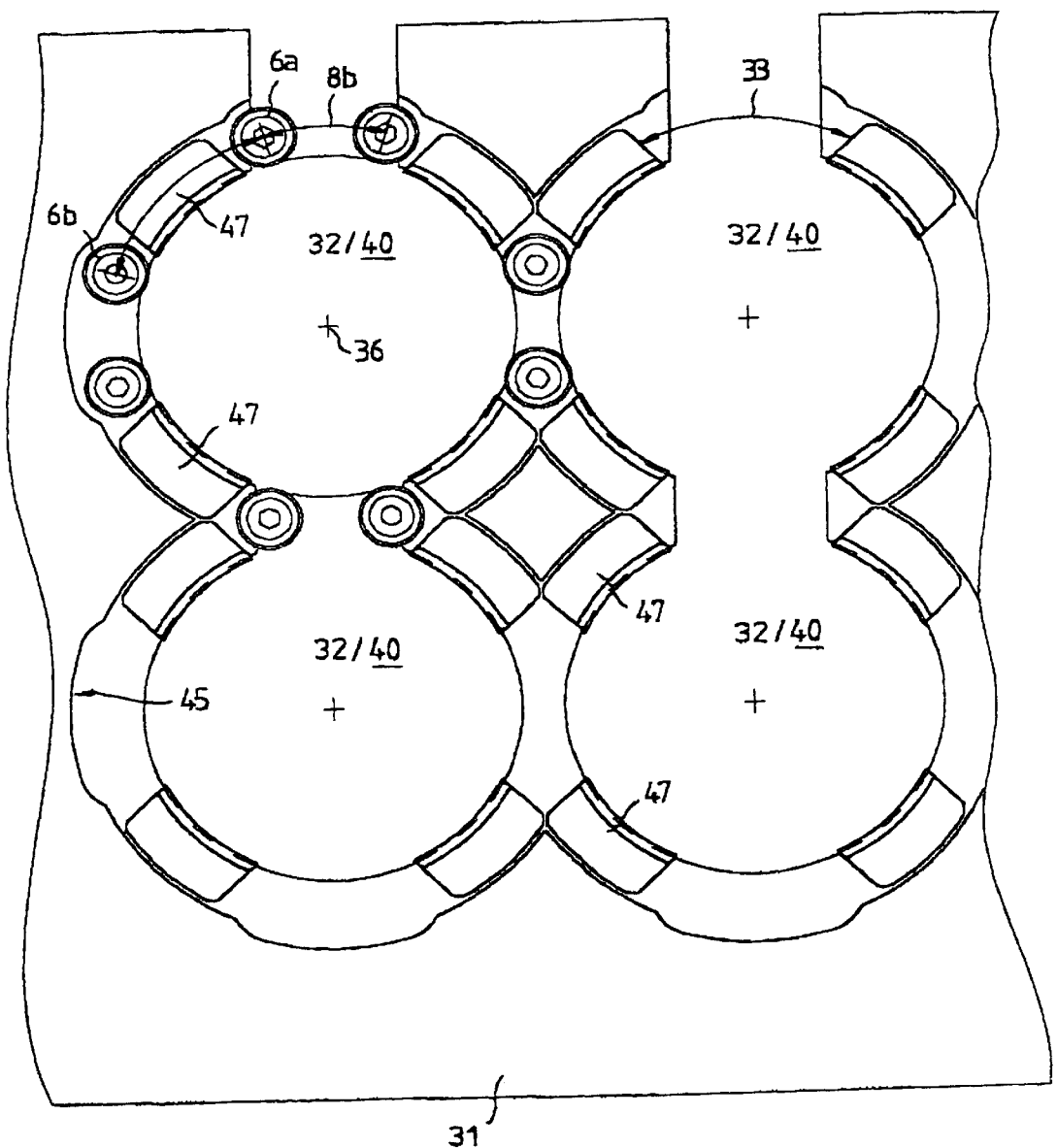
Figure 12:
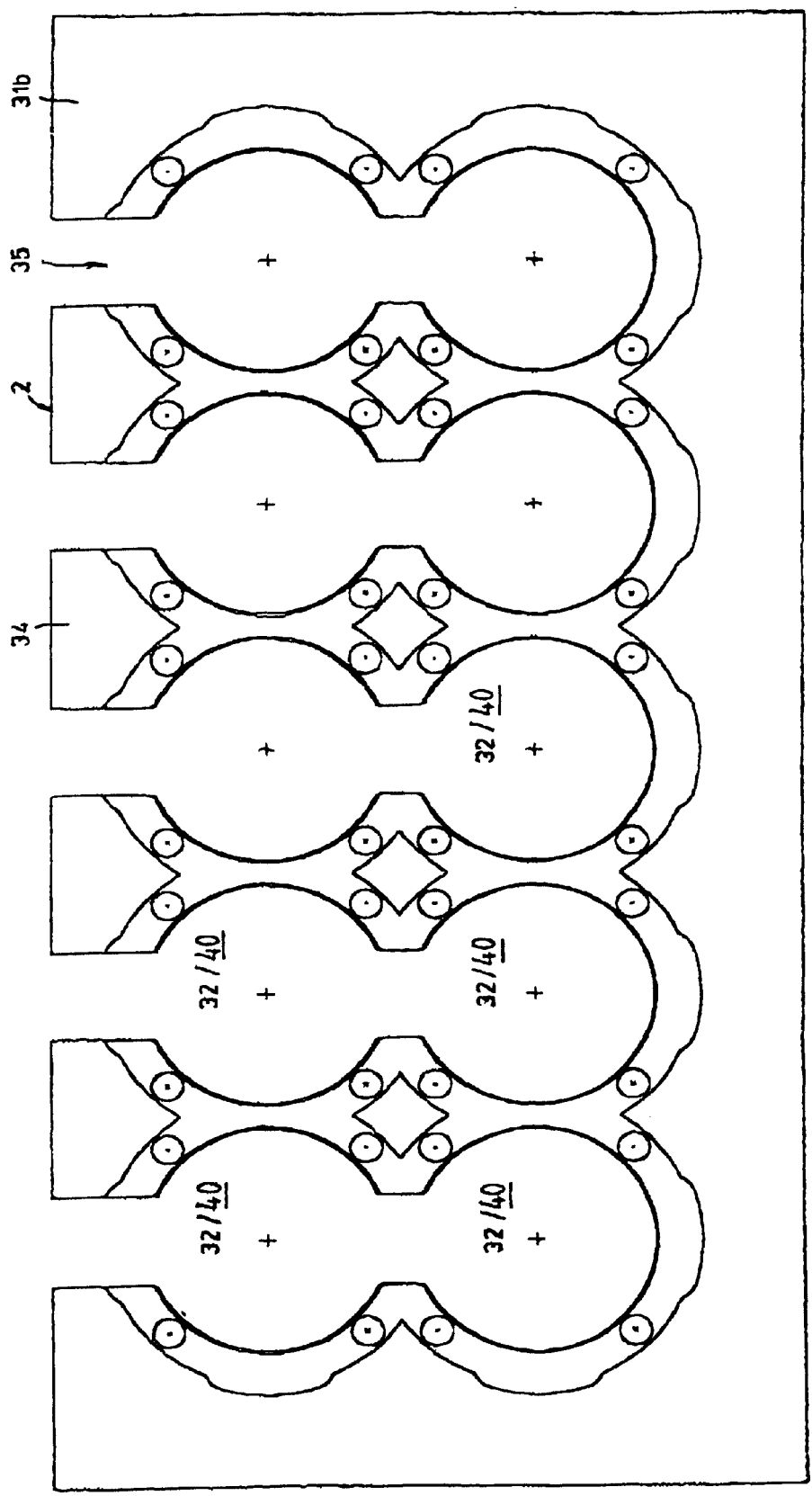

Further features, details, advantages and effects based on the invention follow from the following description of preferred exemplary embodiments of the invention and from the drawings. The latter show in:

FIG. 1 a view undertaken in radial direction onto the axis parallel periphery of a rotationally symmetrical arrangement of catching and stacking and holding devices of a receiving apparatus according to the invention, FIGS. 2a and 2b respectively a partial view cut along the longitudinal axis of a type of a clamping arbor for the catching device according to the invention, FIG. 3 an axial longitudinal section of the stacking and holding device according to FIG. 1, FIG. 4 an axially undertaken sectional view, FIG. 5 a radially undertaken view onto the periphery of a further execution of the receiving apparatus according to the invention, FIG. 6 a sectional view according to line VI—VI in FIG. 5, FIG. 7 a front view onto a catching plate with a multi-plicity of catching chambers of a further execution of the receiving apparatus, FIG. 8 an overhead view onto the corresponding stacking plate of the receiving apparatus according to FIG. 7, FIG. 9 an overhead view onto a further development of the stacking and holding device according to the invention, FIG. 10 the stacking and holding device according to FIG. 9 in axial longitudinal section according to line X—X in FIG. 9, FIG. 11 a sectional view corresponding to FIG. 6 of the development of the invention as per FIGS. 9 and 10 and FIG. 12 an overhead view corresponding to FIG. 8 onto the further embodiment of the stacking plate according to the invention as per FIGS. 9–11.

According to FIG. 1 the receiving apparatus consists of a catching device 1 and a stacking and holding device 2, which lie opposite one another. Their gripping members 3 directed towards one another are fixed on a first bearing ring 4a or a bearing plate with perforation of the catching device 1 and a second bearing ring 4b or a bearing plate with perforation of the stacking and holding device 2 distributed over their respective, opposite front ends 5a, 5b. The gripping members 3 of the catching device 1 are realised as clamping arbors 6a, 6b of circular basic cross-section projecting from the front end 5a. As FIG. 6, also explained further below, shows, eight clamping arbors 6a, 6b are provided in all. They exhibit, alternating from one another in peripheral direction 7a of the bearing ring 4a, a first, greater distance Ba and a second smaller distance 8b from one another. Thus four groups each with a clamping arbor pair 6a, 6b are formed. The two clamping arbors 6a, 6b grouped in pairs and exhibiting the smaller distance 8b from one another differ from one another substantially in an amount of four catch steps 9a on the one hand and three catch steps 9b on the other.

The latter are shown enlarged in FIGS. 2a and 2b. The catch stages 9a, 9b each form the termination of ramp-type peripheral extensions 10, but with one exception: in the case of the clamping arbor 6a with four catch stages 9a the first catch stage 9a, which lies closest to the bearing ring 4a, forms the termination of a peripheral section 11a extending continuously in axial direction from the bearing ring 4a. In the case of the clamping arbor 6b with three catch stages 9b, on the other hand, an identical peripheral section lib extending from the bearing ring 4a is provided, which merges with an axis parallel peripheral section 12. Against the latter abuts—at a further distance from the bearing ring 4a—the first of the already mentioned ramp-type peripheral extensions 10. As indicated with dashed lines 13, the catch stages 9a of the one clamping arbor 6a are offset axially relative to the catch stages 9b of the other clamping arbor 6b. According to the example shown, a total of seven catching possibilities are therefore obtained for a plastic cup (shown in broken lines in FIG. 1). Because, therefore, there always lies opposite a catch stage 9a, 9b of a clamping arbor 6a an axis parallel peripheral section 38 of the respective other clamping arbor 6b, an excessively strong clamping and hence a deformation of the plastic cup 14 is prevented when the latter is pushed out of a mould between the clamping arbors 6a, 6b of the catching device 1. According to FIGS. 2a and 2b, the area with the catch stages 9a, 9b is followed—viewed from the bearing ring 4a—by an axis parallel outer peripheral section 15 on the clamping arbors 6a, 6b. The free ends of the latter are formed by a conical tapering section 16. The clamping arbors 6a, 6b are formed as hollow cylinders with a hollow space 17. There is inserted into the latter a fixing screw 18, which passes substantially through the area with the catch stages 9a, 9b and with the bearing ring 4a inclusive. The engagement with the inside of the bearing ring 4a takes place via a corresponding internal thread and an external thread 19 of the fixing screw.

According to FIG. 1 the gripping members 3 of the stacking and holding device 2 are realised by claw projections 20, which are fixed to the associated bearing ring 4b by means of a fixing flange 21 bent outwards in an L-shape and a fixing screw 22 passing through the latter. As an additional consideration of FIG. 6 also shows, the claw projections 20 are extended curved two-dimensionally in peripheral direction 7a in such a way that—on a rough estimation—they are able to cover about a third of the external peripheral surface of a received plastic cup 14.

The claw effect becomes particularly clear from the sectional representation according to FIGS. 3 and 4. On the inner side 23 of the claw projection 20 are formed at least two barb stages 24. The barb stage 24 lying closest to the free end 25 of the claw projection 20 forms the termination of an inner side inlet ramp section 26, which with increasing closeness to the bearing ring 4b at the inlet of the stacking and holding device causes within the—in the example four—claw projections 20 a tapering or narrowing of the receiving volume available for the plastic cup 14.

Against the barb stage 24 lying closest to the free end 25 there abuts a first, axis parallel inner side section 27, which is terminated by the barb stage 24 lying closest to the bearing ring 4b. Against the latter abuts a second, likewise axis parallel inner side section 28, which because of the gradation limits a greater inner diameter than the first inner side section 27.

As regards the mode of operation of the receiving apparatus according to the invention and in particular the interaction of its catching and stacking and holding devices 1, 2, the following may be stated: according to FIG. 1 the claw projections 20 of the stacking and holding device 2 are in peripheral direction 7a arranged offset relative to the clamping arbor pairs 6a, 6b of the catching device 1 in such a way that each claw projection 20 may be inserted between two clamping arbors 6a, 6b which exhibit the greater distance 8a from one another. The two-dimensional extension in peripheral direction 7a is in the case of the claw projections 20 measured specially or else according to this consideration. If the catching device 1 and the stacking and holding device 2 are in the disengaged position, the plastic cup 14 may in the first phase of the receiving operation be ejected out of the plastic mould (not shown) and first of all pushed through the bearing ring 4a of the catching device between the latter 8 clamping arbors 6a, 6b. At the same time the cup 14 slides, preferably with its upturned opening edge 29 outwards, first of all along the first peripheral sections 11a, 11b (cf. FIGS. 2a, 2b), then partly on the axis parallel peripheral section 12 of the clamping arbor 6b with three catch stages 9b until it comes to a stop behind the first, second, etc. catch stage 9a, 9b. The cup is then no longer movable backwards because of the respective counteracting catch stage, and a further movement in the direction of the free ends of the clamping arbors 6a, 6b would require further pressure on the cup 14 in the direction of the stacking and holding device 2, in order to overcome the one or more peripheral extensions 10 on the clamping arbors 6a, 6b. This is brought about in the second phase by the claw projections 20 of the stacking and holding device 2 by means of the latter's barb stages 24. To this end the stacking and holding device 2 dips together with its claw projections 20 into the free spaces of the greater distances Ba between the clamping arbors 6a, 6b. This is realised suitably by there being imparted to the catching device 1 alternatively a to and fro movement 30 between the mould (not shown) and the stationary stacking and holding device 2. In the dipped state, when the catching and the stacking and holding devices 1, 2 have engaged with one another with their gripping members 3, the claw projections 20 with their barbs 24 grip the cup 14 from behind on its opening edge 29, after the latter has slid along against the inner side inlet ramp section 26 of the free end 25 of the claw projection 20 in the course of the movement 30 of the catching device 1 towards the stacking and holding device 2. If now the movement 30 for the disengagement of the catching and the stacking and holding devices 1, 2 is reversed, the cup opening edge 29 will be held firm between the claw projections 20 on the latters' barbs 24; at the same time the overcoming of the ramp-like, ascending peripheral extensions 10 on the outer surfaces of the clamping arbors 6a, 6b takes place, which leads to only a slight, reversible deforming of the cup opening edge 29. If the catching device 1 and the stacking and holding device 2 have fully disengaged, the plastic cup previously caught between the clamping arbors 6a, 6b is now caught only by the claw projections 20. In the course of a further cup take-over cycle, with renewed engagement of catching and stacking and holding devices, the last cup 14 received between the claw projections 20 is admittedly moved back again between the clamping arbors 6a, 6b of the catching device; however, the conical tapering section 16 (which expands the closer it gets to the bearing ring 4a) and/or at least the catch stage 9a furthest removed from the bearing ring 4a lead to a further displacement of the cup 14, which was held first of all by the barb stage 24 lying closest to the free end 25 of the claw projection 20, in the. direction of the bearing ring 4b of the stacking and holding device 20. Said (repeated) displacement produces with each take-over cycle or stroke an enlargement of the cup stack forming within the claw projections. A backward movement in the direction of the catching device 1 or of the mould arranged upstream of the latter is prevented by the two barb stages 24. During the engagement of the catching and stacking and holding devices 1,2 the last cup received in the stacking and holding device, which is located directly on the barb stage 24 lying closest to the free end 25, does not come into contact with the last cup 14 ejected out of the mould and located between the clamping arbors 6a, 6b. The latter is therefore decoupled from a stack displacement of the cups 14 stacked between the claw projections 20 and is not deformed by the latter. In the take-over sequence according to the invention only the catching device is required as an intermediate station.

According to FIGS. 5 and 6 the catching and the stacking and holding devices are each constructed as a baseplate 31a, 31b, which is perforated "spectacle-like" by a plurality of identical receiving compartments 32. Each compartment includes the receiving area surrounded by the clamping arbors 6a, 6b and the receiving area aligned with it and surrounded by the claw projections 20. To simplify the drawing, only the clamping arbors 6a, 6b of one receiving compartment 32 are shown. Moreover, the reference numbers given in FIGS. 5 and 6 represent matching parts in FIGS. 1–4. It can also be seen that the peripheral distance 33 between two claw projections 20 corresponds roughly to the angular periphery which a pair of clamping arbors 6a, 6b with a different number of catch stages 9a, 9b and a smaller distance 8b from one another occupies.

According to FIGS. 7 and 8 there may be arranged in the baseplates 31a, 31b a multiplicity of receiving compartments 32. The baseplate 31b of the stacking and holding device or "stacking spectacle" 2 is provided on at least one upper edge 34 with cutouts 35 which create passages for an expelling rake known per se (not shown) for removing cup stacks from the stacking and holding device 2. In comparison, in the case of the baseplate 31a of the catching device or "catching spectacle" 1 such cutouts or openings in the receiving compartments 32 are not necessary, a fact which enhances the overall mechanical stability of the baseplate 31a.

In FIGS. 9 and 10 is shown a particular development according to the invention of the stacking and holding device 2. The latter is constructed substantially of a claw member 39 with an approximately ring-shaped or hollow cylindrical basic shape. The latter defines or limits a stacking channel 40 of cylindrical cross-section. It incorporates gripping pawls 41, in the example four in number, which butt directly against the stacking channel 40, as well as a roughly circular or hollow cylindrical protective wall 42, which surrounds the gripping pawls 41 on the outside. The protective wall 42 comprises, distributed uniformly over its periphery, alternately thicker surface sections 43, which cover a gripping pawl 41 radially directly from the outside, and thinner surface sections 44, The thinner surface sections 44 are formed by interior cutouts or recesses 45. The latter create space for the dipping of the clamping arbors 6a, 6b on the bearing ring 4a of the catching device 1, as shown in FIG. 10, right-hand half.

According to FIG. 10 the gripping pawls 41 posses the basic structure of a spring-mounted pendulum. The gripping pawl 41 incorporates a basic axial body 46 formed after the manner of a stock, on which is mounted a gripping head 47 having at least one barb stage 24. The basic axial body is for example made of springable steel or metal and is accommodated with its stock-like basic form in a receiving pocket 48, which is formed integrally on the inside, on the respective thicker surface section 43 of the protective wall 42, as a hollow attachment projecting radially inwards. The basic axial body 46 possesses a broadened or radially expanded bottom end 49, which is perforated by an internally threaded bore 50 at right angles to the longitudinal direction 51 of the basic axial body 46. There meshes into or with the internally threaded bore 50 an externally threaded bore 52, which is accessible via an operational opening 53 to a spanner for manual turning. Coinciding with the operational opening 53 is a cutout 54 in the edge area of the inner wall 55 of the receiving pocket 48. The cutout runs roughly radially with respect to the centre axis 56 of the stacking channel 40. It is thereby ensured that the externally threaded pin 52 is accessible for the stopping of the basic axial body 46 with respective to the protective wall 42 only if it coincides with its longitudinal axis with the cutout 54 and therefore likewise lies radially and assumes a defined turning position. The top end of the basic axial body 46 is formed by an external thread 57, by means of which the gripping head 47 is capable of being screwed on with a complementary internal thread. The screwing of the gripping head 47 is limited by a limiting stop 58 in axial direction, which in the example is formed as a radial widening or bulge and is disposed in the area or the immediate vicinity of the top end or external thread 57 of the basic axial body 46. The distance of the stop side 59 of the limiting stop 58 from the top end external thread 57 is measured in axial direction in such a way that at maximum possible screwing depth, with the limiting stop 58 supported with its stop side 59 on the facing underside of the gripping head 47, the internally threaded bore 50 of the bottom end 49, together with externally threaded pin 52 meshing therein and operational opening 53, is offset or rotated compared with the radial position with respect to the stacking channel center axis 56. In said position it is not possible to intervene manually with a spanner through the cutout 54 and operational opening 53 and to rotate the externally threaded pin 52 in such a way that it presses against the inside of the protective wall 42 within the receiving pocket 48 and thus fixes the basic axial body and secures it against rotation. Only when the top end with external thread 57 of the basic axial body 46 is loosened from the gripping head 47 by unscrewing, in such a way that a certain distance exists between the stop side 59 of the limiting stop 58 and the facing underside of the gripping head 47, are the operational opening 53 and the externally threaded pin 52 able to line up or coincide with the radial cutout 54 in the internal wall 55 of the receiving pocket 48 in such a way that manual operation of the externally threaded pin 52 with a spanner is possible.

According to FIG. 9 the just described, only loose screwing on of the gripping head 47 (without tightening and fixing with respect to turning) has the effect of a free pivoting: depending on the form tolerances of a mass-produced product or item for stacking that is to be received, forces and torques are imparted to the gripping head 47 which may be balanced out by a free rotation 60 about the longitudinal direction or longitudinal axis 51 of the basic body 46. In FIG. 9 the above-mentioned longitudinal or rotational axis 51 runs perpendicular to the plane of projection. Since moreover the gripping pawl 41 comprises a stock-like basic axial body 46 of springy material, elastically springy pendulum movements 61, 62 may be imparted both in radial direction from and towards the stacking channel centre axis 56 and tangentially to the peripheral direction of the cylindrical basic form of the stacking and holding device 2. This increases the effectiveness of the automatic nestling of the gripping heads 47 against product for stacking that is to be caught. the inner side of the protective wall 42 in the thicker surface section 43 forms at the same time a rotation limiting stop 64, whereby an unscrewing of the gripping head 47 from the top end of the basic axial body 46 is prevented. If the gripping pawl 41 has to be exchanged for particular reasons (wear, damage or switching to a different type of product for stacking), this may be undertaken rapidly and simply by loosening of the externally threaded pin 52 with respect to the protective wall 42 and by withdrawing the gripping pawl 41 out of the receiving pocket 48 by means of the gripping head 47. The fitting of a replacement gripping pawl is likewise possible rapidly and problem-free, wherein only the operational opening 53 at the bottom end of the basic axial body 46 has to be aligned coincident or in line with the radial cutout 54 on the receiving pocket inner wall 55, in order that the basic axial body 46 may be supported or fixed against the protective wall 42. Further alignment or adjustment of the gripping head 47 is superfluous, because this may take place automatically in the course of operation, depending on deviation within particular form tolerances of the item for stacking, by virtue of the rotary movements 60 on the free screw support via the top end external thread 57.

The above explanations apply analogously to FIGS. 11 and 12, wherein reference may be made in particular to the description of FIGS. 6 and 8 with the reference symbols used there.

List of Reference Symbols
1 catching device
2 stacking device
3 gripping member
4a, 4b bearing ring
5a, 5b front end
6a, 6b clamping arbor
7a peripheral direction
8a great distance
8b small distance
9a, 9b catch stage
10 peripheral extension
11a, 11b peripheral section
12 axis parallel peripheral section
13 lines
14 plastic cup
15 axis parallel peripheral section
16 conical tapering section
17 hollow space
18 fixing screw
19 external thread
20 claw projections
21 fixing flange
22 fixing screw
23 inner side
24 barb stages
25 free end
26 ramp section
27 axis parallel, first inner section
28 axis parallel, second inner section
29 opening edge of the cup
30 to and fro movement
31a, 31b baseplate
32 receiving compartment
33 peripheral distance
34 top edge
35 cutout
36 symmetry element
37 symmetry element
38 axis parallel peripheral section
39 claw member
40 stacking channel
41 gripping pawl
42 protective wall
43 thicker surface section
44 thinner surface section
45 recess
46 basic axial body
47 gripping head
48 receiving pocket
49 bottom end
50 internally threaded bore
51 longitudinal direction
52 externally threaded pin
53 operational opening
54 cutout
55 inner wall
56 centre axis
57 external thread
58 limitation stop
59 stop side
60 rotation
61 radial pendulum movement
62 tangential pendulum movement
63 screwing means
64 rotation limitation stop

I claim:
1. Apparatus for receiving mass-produced articles or stacked products, especially plastic cups, which after having been formed in a moulding and/or punching machine are ejected from same, with a catching device, with which the ejected products are seized, and with a stacking and holding device, which receives the products out of the catching device and after stacking holds them ready for further transport, wherein the catching and the stacking and holding devices are moved towards one another and away from one another, wherein the stacking and holding device is used during the movement towards one another to seize the product or products in the catching direction and during the movement away from one another to withdraw the product or products out of the catching device.

2. A method as claimed in claim 1, wherein the movement towards one another and away from one another of the catching and stacking and holding devices takes place linearly, in a straight line and/or regularly alternately.

3. A method as claimed in claim 1, wherein the catching device is used during the movement towards one another to push the product or products into the stacking and holding device.

4. A method as claimed in claim 3, wherein during the movement towards one another a product already located in the stacking and holding device is displaced further by the catching device for stacking.

5. A method as claimed in claim 1, wherein the last product seized in the stacking and holding device is in each case held unaffected by previously seized products for the period of at least one continuous movement away from one another and towards one another up to the seizing of the next product.

6. A method as claimed in claim 1, wherein during the movement away from one another and/or directly prior to the movement towards one another the catching device is used to seize the products out of the moulding and/or punching machine.

7. An apparatus for the receiving of mass-produced articles, in particular plastic cups, which after being formed in a moulding and/or punching machine are ejected from same, with a catching device assigned to the machine, in order to grasp the products as they leave the machine, and a stacking and handling device situated downstream of the catching device, in which the products are capable of being taken over and are held stacked and ready for further transport, wherein the catching and the stacking and holding devices are movable towards one another and away from one another, wherein gripping members formed for the detachable grasping of the products are arranged there singly or as a plurality on or in both the catching and the stacking and holding direction, in such a way that with the movement of the catching and the stacking and holding devices towards and away from one another a take-over of the products from the catching into the stacking and holding device may take place.

8. A receiving apparatus as claimed in claim 7, wherein at least the catching or preferably the stacking and holding device is stationary or alternatively kept still and the respective other device is supported and driven in a movable manner.

9. A receiving apparatus as claimed in claim 7, wherein the gripping members are formed projecting with respect to the catching or alternatively stacking and holding device.

10. A receiving apparatus as claimed in claim 7, wherein the gripping members on the catching device are arranged offset relative to the gripping members on the stacking and holding device in such a way that the catching and stacking and holding devices in the course of their movement towards and/or against one another mutually cross, penetrate and/or engage with one another.

11. A receiving apparatus as claimed in claim 7, wherein the gripping members of the catching and/or stacking and holding device are arranged symmetrically relative to a plane, axis, centre or other symmetry element which lies coincident with a symmetry element of the associated or to be grasped product.

12. A receiving apparatus as claimed in claim 7, wherein the gripping members are arranged along a profile or plan view which corresponds to the periphery, the outline or the miscellaneous shape of the product to be received.

13. A receiving apparatus as claimed in claim 7, wherein the catching and/or stacking and holding device are simultaneously subdivided into a plurality of preferably identical compartments or other areas for receiving a corresponding plurality of products wherein within a compartment the gripping members are arranged along a profile or plan view which corresponds to the periphery, the outline or the miscellaneous shape of the product to be received.

14. A receiving apparatus as claimed in claim 13, wherein the catching and/or stacking and holding device is formed with a flat and/or plate-type basic form which is passed through by the compartments and/or other receiving areas in the product take-over direction.

15. A receiving apparatus as claimed in claim 7, wherein the gripping members are provided with suspension, clamping, locking, snap and/or hook elements, which are constructed for detachable engagement with the product to be grasped.

16. A receiving apparatus as claimed in claim 15, wherein the suspension, clamping, locking, snap and/or hook elements and/or claw, stay or barb elements or other pulling and/or shear means are, in particular if they lie on different gripping members, arranged mutually offset in the direction from the catching to the stacking and holding device.

17. A receiving apparatus as claimed in claim 15, wherein different gripping members exhibit different numbers of suspension, clamping, locking, snap and/or hook elements and/or claw, stay or barb elements or other shear means.

18. A receiving apparatus as claimed in claim 15, wherein the gripping members, in particular if they are arranged on the catching device, are formed as projecting clamping arbors or gripping pins, which comprise as scale, catch or snap elements one or more external peripheral elements extending in the product take-over direction, which are terminated by respective gradations or radial undercuts a support.

19. A receiving apparatus as claimed in claim 18, wherein the clamping arbor comprises alternately radially extending and axis parallel external peripheral sections.

20. A receiving apparatus as claimed in claim 18, wherein there lies opposite an axis parallel external peripheral section of a clamping arbor an extending external peripheral section or a snap element of another clamping arbor at right angles to the take-over direction.

21. A receiving apparatus as claimed in claim 18, wherein the clamping arbor is tapered at its free end.

22. A receiving apparatus as claimed in claim 7, wherein the gripping members are formed with claw, stay or barb elements or other pulling and/or shear means, so that in the course of the mutual disengagement movement of the catching and stacking and holding devices there is imparted to the grasped products a sliding or shear force in the direction from the catching to the stacking and holding device.

23. A receiving apparatus as claimed in claim 7, wherein the gripping members are arranged at least in part at different distances from one another.

24. A receiving apparatus as claimed in claim 23, wherein the gripping members assigned jointly to a product to be grasped are arranged in part at a greater and in part at a smaller distance from one another, wherein the gripping members at a smaller distance from one another differ in amount of suspension, clamping, locking, snap and/or hook elements and/or stay or barb elements or other pulling and/or shear means, and the elements or means of said gripping members are arranged offset from one another in the direction from the catching to the stacking and holding device.

25. A receiving apparatus as claimed in claim 7, wherein the gripping members, in particular if they are arranged on the stacking and holding device, are formed as two-dimensional claw projections with an inner side assigned to the product and a rearward outer side, wherein on the inner side one or more undercuts, steps or depressions are formed as claw elements or shear means.

26. A receiving apparatus as claimed in claim 25, wherein the claw projection is provided at the free end with a ramp or an oblique section on the inner side opposite its datum plane.

27. A receiving apparatus as claimed claim 26, wherein a plurality of claw projections assigned to a common product extend two-dimensionally in peripheral direction such that they cover one to three tenths, preferably a quarter, of the periphery or outline profile of the product.

28. A receiving apparatus as claimed in claim 25, wherein the claw projections are fixed detachably by means of loosenable fixing means, for example screw means, on the catching and/or stacking and holding device.

29. A stacking and holding device for a receiving apparatus as claimed in claim 25, having at least one stacking channel and having one or more claw members, which run parallel with the stacking channel, surround the latter and are provided on their inner side facing the stacking channel with one or more gripping pawls adjustable rotationally and/or translationally for the grasping of mass-produced articles, especially plastic cups, wherein the gripping pawl is freely pivotable about an axis of rotation which runs parallel with the stacking channel.

30. A stacking and holding device as claimed in claim 29, wherein the axis of rotation runs through a basic body of the gripping pawl.

31. A stacking and holding device as claimed in claim 29, wherein the claw member comprises a protective wall surrounding the gripping pawl(s) on the outside, and wherein the protective wall is formed and arranged opposite the gripping pawl at a distance such that the inner side, facing the gripping pawl, of the protective wall forms a rotation limiting stop with rotation play for the gripping pawl.

32. A stacking and holding device as claimed in claim 29, wherein the axis of rotation of the gripping pawl is included within that of the protective wall and bears the gripping pawl in a freely pivotable manner at its free end.

33. A gripping pawl as claimed in claim 32, wherein the stopping means are realised in the central area or at the bottom end of the basic body by a manually screwable externally threaded pin and a transversely running and continuous internally threaded bore engaging with the latter.

34. A gripping pawl for a stacking and holding device as claimed in claim 32, with an inner side assigned to a product or an item for stacking that is to be received and a rearward outer side, wherein on the inner side one or more undercuts, steps or depressions are formed as claw elements or shear means for the product or the item for stacking, wherein an axis of rotation integral to the body is realised by an elongated basic body with a top and a bottom end, wherein at the top end a gripping head assigned to the respective item for stacking is freely pivotable, and in the central area of the basic body or at its bottom end means for stopping against or opposite the stacking and holding device are formed.

35. A gripping pawl as claimed in claim 34, wherein the basic body is made of elastically and/or springily flexible material.

36. A gripping pawl as claimed in claim 34, wherein the gripping head is attached to the basic body in a loosenable or alternatively detachable manner and on the inside is adapted in its form and/or contour to the item for stacking that is to be grasped.

37. A gripping pawl as claimed in claim 32, wherein the gripping head on the top end is arranged so as to be rotatable to and fro via a screw connection.

38. A stacking and holding device as claimed in claim 32, wherein the protective wall is provided on its inner side with an opening or cutout leading to the axis of rotation and preferably running radially, in order to actuate any means of the axis of rotation for their stopping opposite the surrounding protective wall.

39. A gripping pawl as claimed in claim 38, wherein the basic body comprises a gripping head, a screw-in limitation stop which possesses a distance measured with respect to a screw-in thread at the top end of the basic body, such that if the gripping head stops or comes to rest against the limitation stop the centre axis of the internally threaded bore runs parallel with a notional straight line, which passes at an oblique angle through a lateral surface, assigned to the item for stacking, of the gripping head.

* * * * *